(12) United States Patent  
Morris et al.

(10) Patent No.: US 11,511,480 B2
(45) Date of Patent: Nov. 29, 2022

(54) SYSTEM FOR ADDITIVE MANUFACTURING

(71) Applicant: Continuous Composites Inc., Coeur d'Alene, ID (US)

(72) Inventors: Rachael Kathleen Morris, Liberty Lake, WA (US); Ryan C. Stockett, Spokane, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 415 days.

(21) Appl. No.: 16/584,196

(22) Filed: Sep. 26, 2019

(65) Prior Publication Data

US 2020/0130270 A1 Apr. 30, 2020

Related U.S. Application Data

(60) Provisional application No. 62/751,461, filed on Oct. 26, 2018.

(51) Int. Cl.
 *B29C 64/118* (2017.01)
 *B29C 64/209* (2017.01)
 (Continued)

(52) U.S. Cl.
 CPC .......... *B29C 64/118* (2017.08); *B29C 64/106* (2017.08); *B29C 64/209* (2017.08);
 (Continued)

(58) Field of Classification Search
 CPC ... B29C 64/106; B29C 64/118; B29C 64/209; B29C 64/295; B29C 64/393;
 (Continued)

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Philip C Tucker
*Assistant Examiner* — Evan T Hulting
(74) *Attorney, Agent, or Firm* — Ryan C. Stockett

(57) ABSTRACT

A system is disclosed for additive manufacturing of a composite structure. The system may include a support, and a print head connected to and moveable by the support. The print head may include an outlet configured to discharge a continuous reinforcement at least partially coated in a matrix. The outlet may be moveable relative to the support. The print head may also include at least one actuator configured to cause movement of the outlet relative to the support.

4 Claims, 2 Drawing Sheets

(51) Int. Cl.

| | |
|---|---|
| *B33Y 70/00* | (2020.01) |
| *B29C 64/393* | (2017.01) |
| *B33Y 30/00* | (2015.01) |
| *B29C 70/38* | (2006.01) |
| *B29C 64/295* | (2017.01) |
| *B29C 64/106* | (2017.01) |
| *B29K 101/10* | (2006.01) |
| *B33Y 10/00* | (2015.01) |
| *B33Y 70/10* | (2020.01) |

(52) U.S. Cl.
CPC .......... *B29C 64/295* (2017.08); *B29C 64/393* (2017.08); *B29C 70/384* (2013.01); *B33Y 30/00* (2014.12); *B33Y 70/10* (2020.01); *B29K 2101/10* (2013.01); *B33Y 10/00* (2014.12)

(58) Field of Classification Search
CPC ..... B29C 70/384; B29C 70/54; B29C 64/314; B29C 70/38; B29C 70/382; B29K 2101/10; B33Y 10/00; B33Y 30/00; B33Y 70/00; B33Y 50/02; B22F 10/20; B22F 10/30; B29B 15/127; Y02P 10/25
See application file for complete search history.

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark | |
| 9,694,544 B2 | 7/2017 | Mark | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0078073 A1* | 3/2013 | Comb | B29C 64/106 414/749.1 |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2015/0147424 A1* | 5/2015 | Bibas | B29C 64/112 425/150 |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0346998 A1 | 12/2016 | Mark et al. | |
| 2016/0361869 A1 | 12/2016 | Mark et al. | |
| 2016/0368213 A1 | 12/2016 | Mark | |
| 2016/0368255 A1 | 12/2016 | Witte et al. | |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0007362 A1 | 1/2017 | Chen et al. | |
| 2017/0007363 A1 | 1/2017 | Boronkay | |
| 2017/0007365 A1 | 1/2017 | Kopelman et al. | |
| 2017/0007366 A1 | 1/2017 | Kopelman et al. | |
| 2017/0007367 A1 | 1/2017 | Li et al. | |
| 2017/0007368 A1 | 1/2017 | Boronkay | |
| 2017/0007386 A1 | 1/2017 | Mason et al. | |
| 2017/0008333 A1 | 1/2017 | Mason et al. | |
| 2017/0015059 A1 | 1/2017 | Lewicki | |
| 2017/0015060 A1 | 1/2017 | Lewicki et al. | |
| 2017/0021565 A1 | 1/2017 | Deaville | |

(56) References Cited

U.S. PATENT DOCUMENTS

| | | |
|---|---|---|
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda et al. |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2017/0368739 A1 | 12/2017 | Brennan |
| 2018/0067464 A1 | 3/2018 | Budge et al. |
| 2020/0031057 A1* | 1/2020 | Yan .................. B33Y 10/00 |
| 2020/0147873 A1* | 5/2020 | Lewis ................. B29C 64/118 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2015009938 A1 | 1/2015 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A, C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acryiate/Glass-Fiber Composites Cured Layer by Layer, Journal of Applied Polymer Science, vol. 123, Issue 6, pp. 3799-3805 (May 15, 2012).

International Search Report dated Dec. 20, 2019 for PCT/US2019/054041 to Continuous Composites Inc. Filed Oct. 1, 2019.

\* cited by examiner

SYSTEM FOR ADDITIVE MANUFACTURING

RELATED APPLICATIONS

This application is based on and claims the benefit of priority from U.S. Provisional Application No. 62/751,461 that was filed on Oct. 26, 2018, the contents of which are expressly incorporated herein by reference.

TECHNICAL FIELD

The present disclosure relates generally to a manufacturing system and, more particularly, to a system for additively manufacturing composite structures.

BACKGROUND

Continuous fiber 3D printing (a.k.a., CF3D®) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. 9,511,543 that issued to Tyler on Dec. 6, 2016 ("the '543 patent").

Although CF3D® provides for increased strength, compared to manufacturing processes that do not utilize continuous fiber reinforcement, improvements can be made to the structure and/or operation of existing systems. For example, motion refinement may allow for fabrication of composite structures having greater detail and/or for accommodating fabrication on existing surfaces having irregular or unexpected contours. The disclosed additive manufacturing system is uniquely configured to provide these improvements and/or to address other issues of the prior art.

SUMMARY

In one aspect, the present disclosure is directed to a system for additive manufacturing. The system may include a support, and a print head connected to and moveable by the support. The print head may include an outlet configured to discharge a continuous reinforcement at least partially coated in a matrix. The outlet may be moveable relative to the support. The print head may also include at least one actuator configured to cause movement of the outlet relative to the support.

In another aspect, the present disclosure is directed to another system for additive manufacturing. The system may include a support, including at least one of a robot arm, a gantry, or a gantry/arm hybrid. The system may also include a print head connected to and moveable by the support in at least one of an X-direction, a Y-direction, and a Z-direction. The print head may include a matrix reservoir configured to at least partially wet a continuous reinforcement with a matrix, and an outlet configured to discharge the continuous reinforcement at least partially wetted with the matrix. The outlet may be moveable relative to the support. The print head may also include at least one actuator configured to cause movement of the outlet relative to the support in the Z-direction. The system may further include a sensor mounted to the print head and configured to generate a signal indicative of a distance from the outlet to a surface onto which the continuous reinforcement at least partially coated with the matrix is to be discharged, and a controller in communication with the support and the sensor. The controller may be configured to make a comparison of an expected distance and the distance from the outlet to the surface, and selectively activate the support to move the print head based on the comparison. The at least one actuator may be configured to cause movement of the outlet independent of operation of the support via closed-loop feedback of the signal from the sensor.

DETAILED DESCRIPTION

Figure 1:
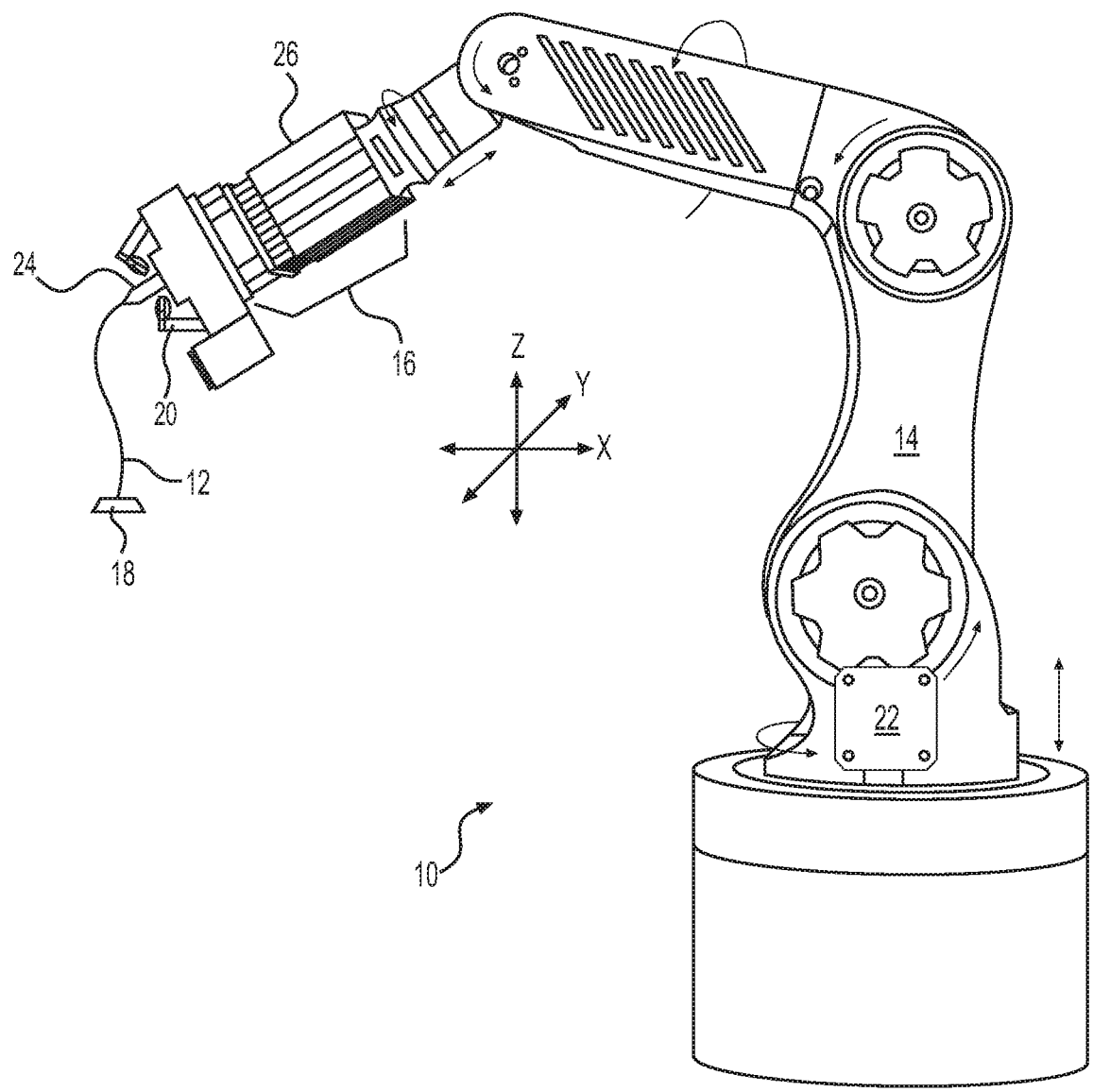
FIG. 1 is an isometric illustration of an exemplary disclosed additive manufacturing system.

FIG. 1 illustrates an exemplary system 10, which may be used to continuously manufacture composite structures 12 having any desired cross-sectional shape (e.g., circular, rectangular, or polygonal). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis (e.g., a trajectory) of structure 12 is three-dimensional. Support 14 may alternatively embody an overhead gantry or a hybrid gantry/arm also capable of moving head 16 in multiple directions during fabrication of structure 12. Although support 14 is shown as being capable of 6-axis movements, it is contemplated that any other type of support 14 capable of moving head 16 in the same or a different manner could also be utilized. In some embodiments, a drive may mechanically couple head 16 to support 14, and include components that cooperate to move portions of and/or supply power to head 16.

Head 16 may be configured to receive or otherwise contain a matrix material. The matrix material may include any type of matrix material (e.g., a liquid resin, such as a zero-volatile organic compound resin, a powdered metal, etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 16 may be pressurized, for example by an external device (e.g., by an extruder or another type of pump—not shown) that is fluidly connected to head 16 via a corresponding conduit (not shown). In another embodiment, however, the pressure may be generated completely inside of head 16 by a similar type of device. In yet other embodiments, the matrix material may be gravity-fed into and/or through head 16. For example, the matrix material may be fed into head 16, and pushed or pulled out of head 16 along with one or more continuous reinforcements. In some instances, the matrix material inside head 16 may need to be kept cool and/or dark in order to inhibit premature curing or otherwise obtain a desired rate of curing after discharge. In other instances, the matrix material may need to be kept warm for similar reasons. In either situation, head 16 may be specially configured (e.g., insulated, temperature controlled, shielded, etc.) to provide for these needs.

The matrix material may be used to coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within (e.g., on one or more separate internal spools—not shown) or otherwise passed through head 16 (e.g., fed from one or more external spools—not shown). When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that are at least partially encased in the matrix material discharging from head 16.

The reinforcements may be exposed to (e.g., at least partially coated with) the matrix material while the reinforcements are inside head 16, while the reinforcements are being passed to head 16, and/or while the reinforcements are discharging from head 16. The matrix material, dry reinforcements, and/or reinforcements that are already exposed to the matrix material may be transported into head 16 in any manner apparent to one skilled in the art. In some embodiments, a filler material (e.g., chopped fibers) may be mixed with the matrix material before and/or after the matrix material coats the continuous reinforcements.

One or more cure enhancers (e.g., a UV light, an ultrasonic emitter, a laser, a heater, a catalyst dispenser, etc.) 18 may be mounted proximate (e.g., within, on, or adjacent) head 16 and configured to enhance a cure rate and/or quality of the matrix material as it is discharged from head 16. Cure enhancer 20 may be controlled to selectively expose portions of structure 12 to energy (e.g., UV light, electromagnetic radiation, vibrations, heat, a chemical catalyst, etc.) during the formation of structure 12. The energy may increase a rate of chemical reaction occurring within the matrix material, sinter the material, harden the material, or otherwise cause the material to cure as it discharges from head 16. The amount of energy produced by cure enhancer 20 may be sufficient to cure the matrix material before structure 12 axially grows more than a predetermined length away from head 16. In one embodiment, structure 12 is completely cured before the axial growth length becomes equal to an external diameter of the matrix coated reinforcement.

The matrix material and/or reinforcement may be discharged from head 16 via at least two different modes of operation. In a first mode of operation, the matrix material and/or reinforcement are extruded (e.g., pushed under pressure and/or mechanical force) from head 16 as head 16 is moved by support 14 to create the 3-dimensional trajectory within a longitudinal axis of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16 with the reinforcement, the resulting tension in the reinforcement may increase a strength of structure 12 (e.g., by aligning the reinforcements, inhibiting buckling, etc.), while also allowing for a greater length of unsupported structure 12 to have a straighter trajectory. That is, the tension in the reinforcement remaining after curing of the matrix material may act against the force of gravity (e.g., directly and/or indirectly by creating moments that oppose gravity) to provide support for structure 12.

The reinforcement may be pulled from head 16 as a result of head 16 being moved by support 14 away from an anchor point 18. In particular, at the start of structure formation, a length of matrix-impregnated reinforcement may be pulled and/or pushed from head 16, deposited onto anchor point 18, and cured such that the discharged material adheres (or is otherwise coupled) to anchor point 18. Thereafter, head 16 may be moved away from anchor point 18, and the relative movement may cause the reinforcement to be pulled from head 16. It should be noted that the movement of reinforcement through head 16 could be assisted (e.g., via internal head mechanisms), if desired. However, the discharge rate of reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

A controller 22 may be provided and communicatively coupled with support 14, head 16, and any number of cure enhancers 20. Each controller 22 may embody a single processor or multiple processors that are configured to control an operation of system 10. Controller 22 may include one or more general or special purpose processors or microprocessors. Controller 22 may further include or be associated with a memory for storing data such as, for example, design limits, performance characteristics, operational instructions, tool paths, and corresponding parameters of each component of system 10. Various other known circuits may be associated with controller 22, including power supply circuitry, signal-conditioning circuitry, solenoid driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of lookup tables, graphs, and/or equations. In the disclosed embodiment, the maps may be used by controller 22 to determine the movements of head 16 required to produce the desired size, shape, and/or contour of structure 12, and to regulate operation of cure enhancers 20 in coordination with the movements.

Figure 2:
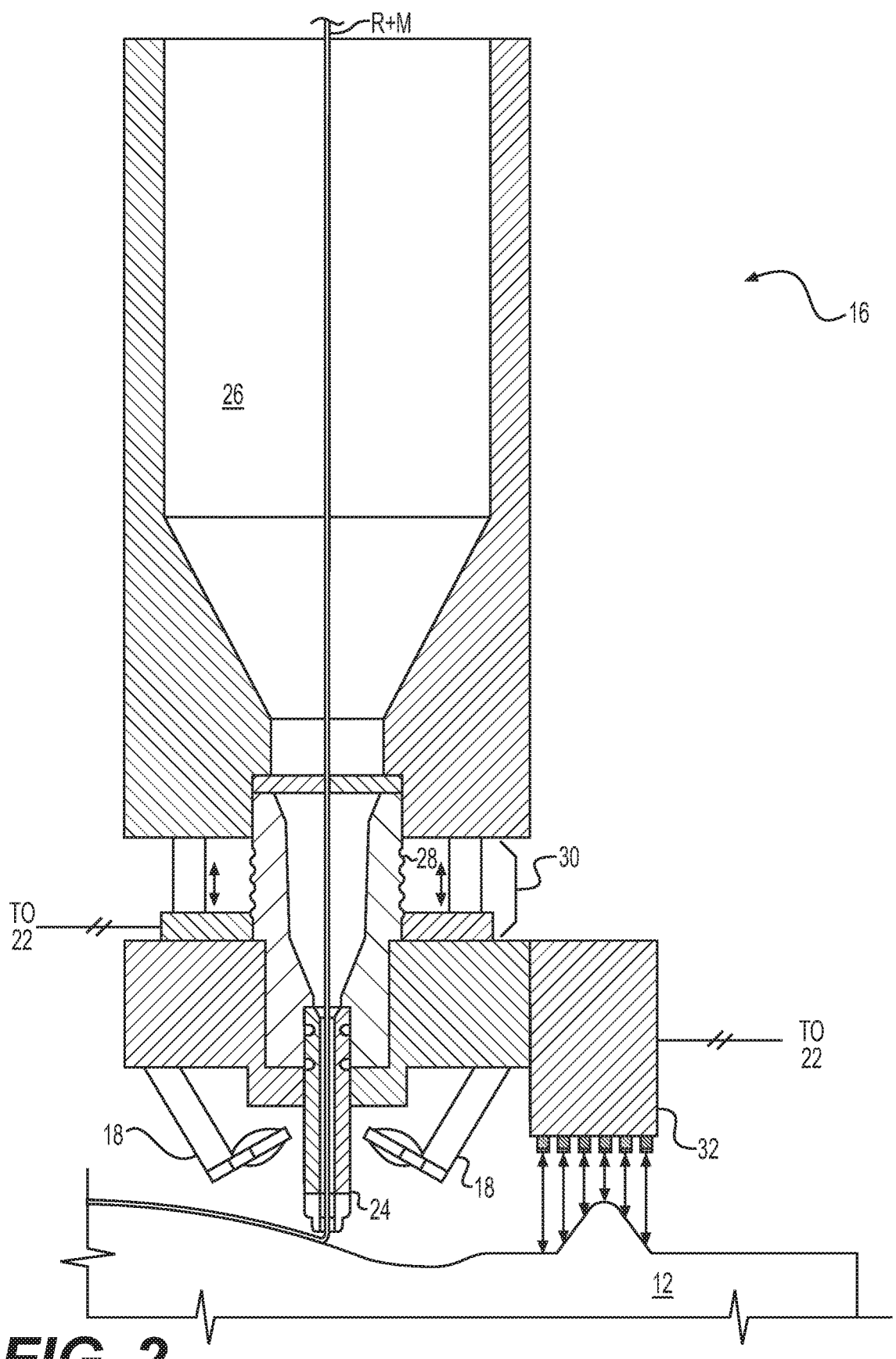
FIG. 2 is a cross-sectional illustration of an exemplary disclosed print head that may be utilized with the additive manufacturing system of FIG. 1.

A side view of an exemplary head 16 is disclosed in detail in FIG. 2. As shown in this figure, head 16 may include, among other things, an outlet 24 and a matrix reservoir 26 located upstream of outlet 24. In this example, outlet 24 is a single-channel nozzle configured to discharge composite material having a generally circular, tubular, or rectangular cross-section. The configuration of head 16, however, may allow outlet 24 to be swapped out for another outlet (not shown) that discharges composite material having a different shape (e.g., a flat or sheet-like cross-section, a multi-track cross-section, etc.). Fibers, tubes, and/or other reinforcements may pass through matrix reservoir 26 and be wetted (e.g., at least partially coated and/or fully saturated) with matrix material prior to discharge.

As described above in reference to FIG. 1, support 14 may be configured to move head 16 in multiple directions during discharge of composite material. For example, support 14 may be configured to move head 16 in an X-, Y-, Z-, and/or Z-rotational direction. It should be noted that support 14 may also or alternatively move head 16 along non-rectangular directions, if desired.

In some embodiments, it may be possible to additionally move portions of head 16 relative to support 14 (e.g., also in the X-, Y-, Z-, and/or Z-rotational directions). For example, an outlet (e.g., nozzle) 24 of head 16, as well as other auxiliary components (e.g., cure enhancers 20, a compactor, a wiper, etc.), may be moveably connected to the rest of head 16 (e.g., to matrix reservoir 26).

As shown in FIG. 2, a flexible conduit 28 may fluidly connect outlet 24 to matrix reservoir 26, and similar flexible connectors (e.g., electrical leads, optical tubes, etc. - not shown) may extend to the other auxiliary components. One or more actuators (e.g., solenoids, motors, leadscrews, pistons, belts, pulleys, slides, cogs, rails, etc.) 30 may be connected between support 14 and outlet 24 (e.g., between matrix reservoir 26 and outlet 24). Actuator(s) 30 may be selective energized by controller 22 (referring to FIG. 1) to provide additional movement of outlet 24 (and any connected auxiliary components) in the X-, Y-, Z- and/or Z-rotational directions relative to support 14. This may allow for high-speed and/or fine adjustments to the material discharge location that might not otherwise be possible via movement of support 14 alone. In one embodiment, actuator(s) 30 may be configured to move outlet 24 in only the Z-direction.

In some embodiments, controller 22 may be configured to selectively activate support 14 and/or energize actuator(s) 30 based on sensory input (e.g., feedforward and/or feedback input). This input may be provided, for example, by way of one or more sensors 32.

For example, a sensor 32 located proximal outlet 24 may be configured to detect a distance of head 16 (e.g., of a tip of outlet 24) away from a surface of structure 12. Sensor 32 may then generate one or more signals indicative of this distance, and communicate the signal(s) to controller 22 for further processing. Sensor 32 may be any type of sensor known in the art, and spatially located ahead of outlet 24 to sense a previously deposited surface of structure 12 (or a surface of an existing structure to be printed on top of), behind outlet 24 to sense a discharging surface, and/or at some other location. Sensor 32 could be an acoustic sensor, a laser or other type of light sensor, a camera, a pressure sensor, or another type of sensor known in the art.

In one embodiment, the signal(s) generated by sensor(s) 32 may be used to regulate operation of support 14. For example, based on a comparison of the detected distance with an expected distance, support 14 may immediately halt movement of head 16 and/or move head 16 to a known safe location. This may occur, for instance, when the comparison indicates a discrepancy between the detected and expected distances that is larger than a high-threshold discrepancy. In another example, controller 22 may cause support 14 to adjust a current tool path and/or one or more future tool paths of head 16 to account for a discrepancy that is less than the high-threshold discrepancy, but larger than an acceptable-threshold discrepancy. For instance, in response to a detected low-spot within the surface of structure 12, controller 22 may cause support 14 to slow or pause movement of head 16 at the point of discrepancy, such that additional matrix may be deposited to fill the low spot. Alternatively, controller 22 may cause support 14 to deviate from a single pass over the low-spot to multiple overlapping passes prior to allowing head 16 to continue along a predefined tool path. During operation in a reverse situation (e.g., in response to a detected high spot), controller 22 may cause the point of discrepancy to be skipped or passed over quicker than specified during travel of head 16 along a predefined tool path, such that only matrix or a lesser amount of matrix and/or reinforcement covers the high-spot. When a detected surface has an undesired (e.g., transversely sloping) contour, controller 22 may cause support 14 to side-step and/or angle head 16. Other similar support-generated maneuvers may also be possible.

It is also contemplated that controller 22 may selectively implement a calibration procedure for support 14 based on the discrepancy. For example, controller 22 may selectively implement the calibration procedure and generate a constant offset for future use, when the comparison indicates a relatively constant discrepancy over a period of time and/or head travel distance.

In other embodiments, the signal(s) generated by sensor(s) 32 may be used primarily to regulate actuators 30. For example, controller 22 may regulate support 14 in a feed-forward manner to follow a predefined trajectory during material discharge, and selectively energize actuators 30 in a feedback manner based on the signals from sensor(s) 32 only when the trajectory results in a distance discrepancy between head 16 and the surface of structure 12 that is greater than the acceptable-threshold discrepancy. In this manner, the signals from sensor(s) 32 may be used only to trim the predefined motion of head 16. It is contemplated that the signals from sensor(s) 32 may be used to simultaneously control support motion and outlet motion in a coordinated manner, if desired. It is also contemplated that actuator(s) 30 may be controlled via a local closed-loop algorithm based on local feedback directly from sensor(s) 32, without controller 22 being directly involved in the process.

Controller 22 may also be configured to selectively adjust operation of the other accessory components of head 16 based on the signals from sensor(s) 32. For example, controller 22 may be configured to adjust an intensity and/or location of cure energy around a detected point of discrepancy. For instance, a detected high-spot on the surface of structure 12 may be cured to a lesser amount, such that compaction of subsequent overlapping layers may reduce the high-spot. In addition, one or more flags (e.g., electronic notifications) may be generated based on the discrepancy, allowing a user to make any of the adjustments described above.

INDUSTRIAL APPLICABILITY

The disclosed systems may be used to continuously manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10.

To install the reinforcements, individual fibers, tows, and/or ribbons may be passed through matrix reservoir 26 and through outlet 24. In some embodiments, the reinforcements may also need to be connected to a pulling machine (not shown) and/or to a mounting fixture (e.g., to an anchor point 18). Installation of the matrix material may include filling head 16 (e.g., reservoir 26) and/or coupling of an extruder (not shown) to head 16.

The component information may then be used to control operation of system 10. For example, the reinforcements may be pulled and/or pushed along with the matrix material from head 16. Support 14 may also selectively move head 16 and/or anchor point 18 in a desired manner, such that an axis of the resulting structure 12 follows a desired three-dimensional trajectory. Cure enhancers 20, outlet location, support motion, and/or other operating parameters of system 10 may be adjusted in real time during operation to provide for desired surface conditions of structure 12. Once structure 12 has grown to a desired length, structure 12 may be severed from system 10.

It will be apparent to those skilled in the art that various modifications and variations can be made to the disclosed systems. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for additive manufacturing, comprising:
   a support;
   a print head connected to and moveable by the support, the print head including:
      a matrix reservoir configured to at least partially wet a continuous reinforcement with a matrix;
      an actuator connected to the support; and
      a module connected to and moveable by the actuator, the module having an outlet configured to discharge the continuous reinforcement, at least partially wetted with the matrix onto a surface;
      a sensor configured to generate a signal indicative of an operation of the print head; and
   a controller in communication with the actuator and the sensor, the controller being configured to cause, based at least in part on the signal, the actuator to:
      move the module, in a first direction towards the surface, to a first position, wherein at the first position the outlet is spaced apart from the surface by a first distance, the print head being stationary during movement of the module in the first direction, and
      move the module, in a second direction away from the surface, to a second position, wherein at the second position the outlet is spaced apart from the surface by a second distance greater than the first distance, the print head being stationary during movement of the module in the second direction.

2. The system of claim 1, wherein:
   during movement of the module in the first direction or the second direction, the support is configured to move the print head in a third direction; and
   the third direction is different than the first direction and the second direction.

3. The system of claim 1, wherein movement of the module in the first direction causes the continuous reinforcement to be pushed out the print head.

4. The system of claim 1, further comprising a cure enhancer connected to the print head and configured to expose the continuous reinforcement, at least partially wetted with the matrix, to a cure energy.

* * * * *